June 26, 1956  W. K. ASBECK  2,751,782
METHOD AND APPARATUS FOR DETERMINING CRITICAL
PIGMENT VOLUME CONCENTRATIONS
Filed Dec. 23, 1947  2 Sheets-Sheet 1
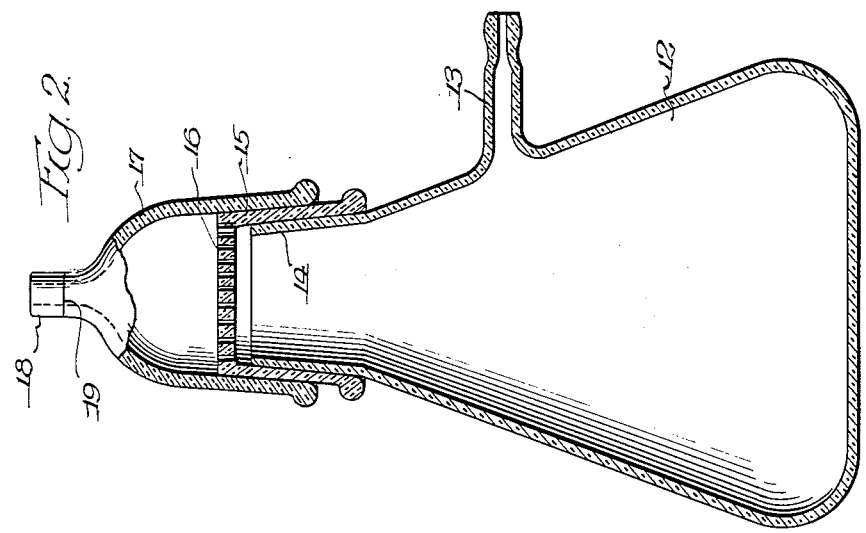
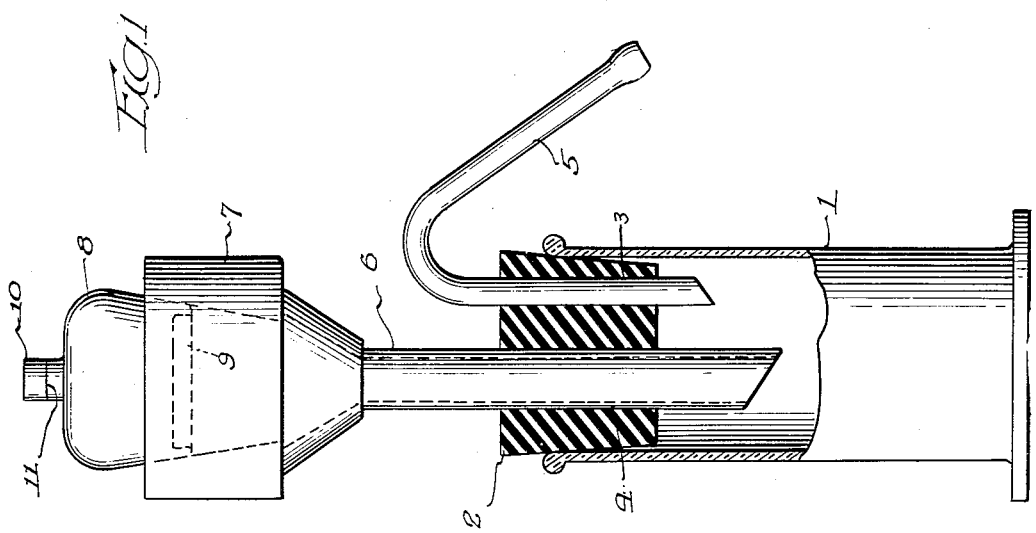
Inventor
Walter Karl Asbeck
By: Spencer, Marzall, Johnston & Cook
Attys

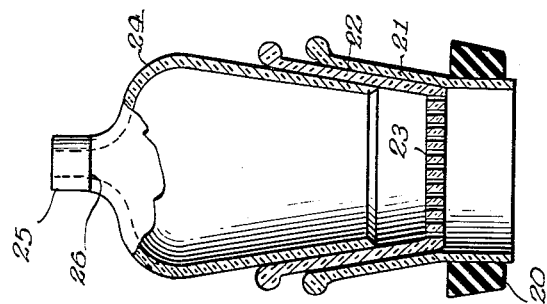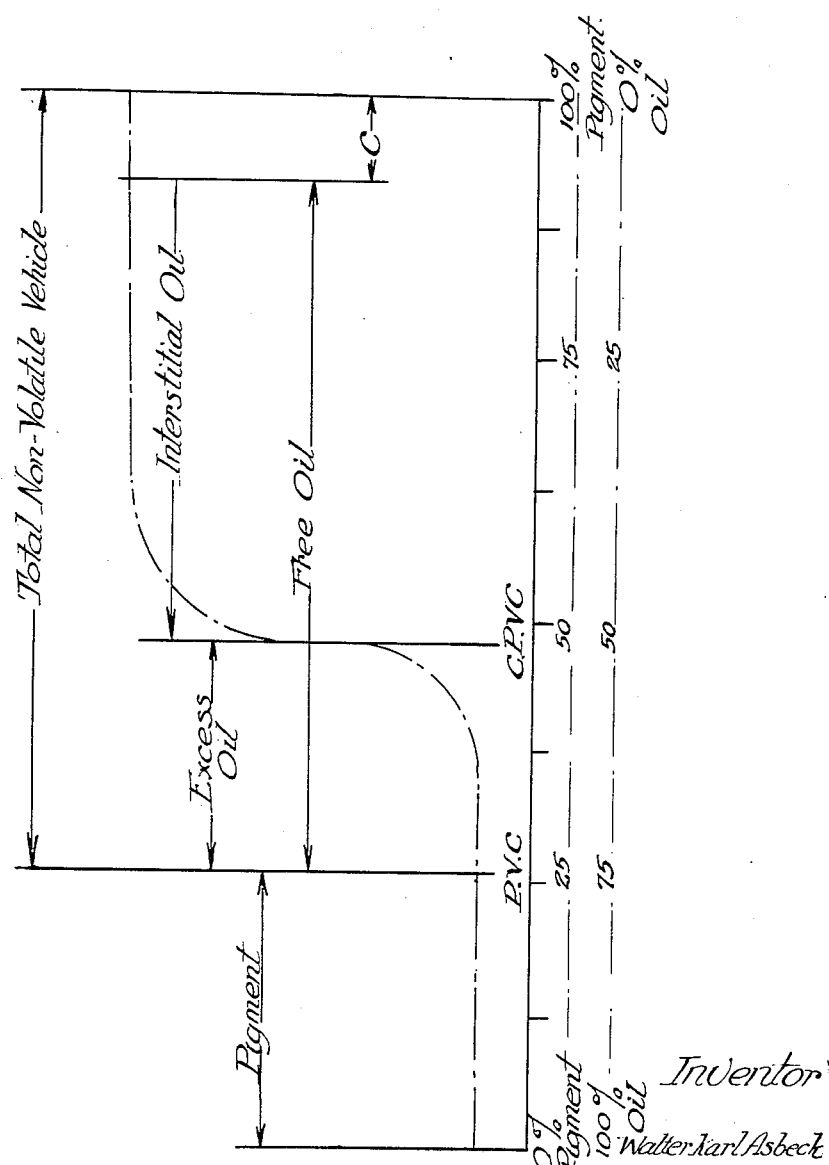

United States Patent Office 2,751,782
Patented June 26, 1956

2,751,782

METHOD AND APPARATUS FOR DETERMINING CRITICAL PIGMENT VOLUME CONCENTRATIONS

Walter Karl Asbeck, Cleveland, Ohio, assignor to The Sherwin-Williams Company, Cleveland, Ohio, a corporation of Ohio Application December 23, 1947, Serial No. 793,504

3 Claims. (Cl. 73—61)

This invention relates in general to a method of determining relationships existing in a pigment-vehicle combination, and to an apparatus particularly useful in carrying out the method. While the invention herein may be applied generally to numerous different fields including the textile and paper coating fields as well as to printing inks, rubber, and any field wherein pigmentary substances are used in combination with liquid binders or vehicles, it has been found particularly useful in the field of paints.

The method and apparatus herein are useful for the determination of the critical pigment volume concentration of any particular or given pigment-vehicle combination. In any given pigment-vehicle combination there will be a transitional point in many of the behavior characteristics thereof when applied as a coating. That is, changes in the pigment volume concentration of the pigment-vehicle combination will result in changes in such behavior characteristics as rust resistance, blistering, gloss, permeability of the coating and the like. In the manufacture of such pigment-vehicle combinations in the field of paints it has been determined that there will be a critical point in the pigment volume concentration above and below which the changes in the behavior characteristics will become very marked. It is the determination of this critical pigment volume concentration of a given pigment-vehicle combination to which the present invention particularly relates.

As used herein, the term pigment volume concentration is the ratio of the pigment volume to the pigment volume plus the non-volatile vehicle volume. When the combination is originally mixed, certain predetermined parts by weight of the ingredients are mixed together and the pigment volume concentration of the particular mixture can be readily calculated from the bulking values of the pigment used, the weight of the vehicle and its specific gravity.

Heretofore the method of determining the critical pigment volume concentration for a given system of pigment and vehicle has been laborious and time consuming. Perhaps the best known of former methods is that which consisted in making up a series of formulations using the combination of pigments and vehicle of interest and varying the pigment volume concentration from about 25% through about 65% in increments of about 5%. Each of these batches are ground to a standard degree of dispersion, drawn down to a film of uniform thickness on a standard permeability paper and dried for a sufficient period of time to insure a representative film. The porosity of the film in each case is determined by a measure of the permeability of the film, that is, its ability to transmit a standard vapor therethrough. The critical pigment volume concentration of that particular system may be determined by plotting the rate of vapor transmission against the pigment volume concentration.

It is evident that the foregoing method of determining the critical pigment volume concentration of any particular system is time consuming, often requiring several weeks to complete and necessitates considerable manipulated skill.

The principal object of the present invention is, therefore, to overcome the obvious disadvantages inherent in the method of determining the critical pigment volume concentration of a particular pigment-vehicle combination heretofore present in former methods.

Another object of the invention is to provide a method for the determination of the critical pigment volume concentration of any given pigment-vehicle combination which may be easily and quickly carried out.

A further object of the invention is to provide a method for determining the critical pigment volume concentration of a given pigment-vehicle combination wherein only one sample of the combination need be prepared.

Still another object of the invention is to provide a method of determining the critical pigment volume concentration of any given pigment-vehicle combination wherein the excess vehicle of a sample from a given combination is filtered out and the desired result is calculated from the volume of residue remaining from the filtering operation.

A still further object of the invention is to provide an apparatus for carrying out the method of determining the critical pigment volume concentration of a given pigment-vehicle combination.

Other objects and advantages of the invention will become apparent upon reading the following description taken in conjunction with the accompanying drawings in which:

Fig. 1 illustrates one form of an apparatus for carrying out the method of the present invention;

Fig. 2 is a vertical sectional view through a modified form of apparatus;

Fig. 3 is a vertical sectional view of a still further modified form of apparatus which is particularly adapted for use in connection with a centrifuge; and Fig. 4 is a graphic representation of the pigment volume concentration curve useful in a study of pigment-vehicle combinations.

Briefly described, the method of determining the critical pigment volume concentration of a given pigment-vehicle combination in accordance with the present invention involves first the preparation of a combination of pigments and vehicles of particular interest to the investigator. The usual combination may be mixed by preparing predetermined parts by weight of pigment and vehicle and then adding a thinner thereto such as naphtha, in order to make the combination flow easily. The volume of the pigment and vehicle may easily be determined, as hereinabove indicated, from the bulking values of the pigments, the weight of the vehicle and its specific gravity. The result is a pigment-vehicle combination containing known volumes of pigment and vehicle. The next step in the process is the filtering out of the excess vehicle, whereupon a filter cake remains which constitutes all of the pigment solids and a certain amount of the vehicle filling the interstices of the pigment and adsorbed thereon. The volume of this filter cake is then determined by any suitable means, and the ratio of the volume of the pigment solids in the original sample to the volume of the filter cake will then represent the critical pigment volume concentration of that particular pigment-vehicle combination.

For purpose of illustration, an actual example will be given of a pigment-vehicle combination which was made up and filtered in accordance with the foregoing method. Any arbitrary ratio of pigment volume to pigment volume plus vehicle volume may be chosen. In this particular instance a ratio of 1:4 was used. The pigment-vehicle combination was prepared by mixing 211 parts by weight of magnesium silicate, 289 parts by weight of titanium dioxide, 410 parts by weight of raw linseed oil, and 105 parts by weight of V. M. and P. naphtha for a thinner.

After thorough mixing this combination was ground to a standard degree of fineness as determined upon a Hegman grind gauge (see "Physical and Chemical Examiner of Paints, Varnishes, Lacquers and Colors," 10th edition, page 277, by Henry A. Gardner).

The resultant paint was then diluted equal parts by volume with additional naphtha and a 10 cc. aliquot sample was placed into a filter cell. The filter cell was placed over the open upper end of a flask and a vacuum was applied to the flask to accelerate the filtering step. All of the excess free liquid from the sample was filtered out leaving the filter cake in the cell. The volume of the filter cake was then determined in a manner hereinafter more fully described in connection with the apparatus. The filter cake was determined to have a volume of 2.65 cc.

It will be noted that there was some solvent in the original sample under investigation and, since the pigment volume concentration is calculated on a solids or nonvolatile basis, it is necessary to make correction for the solvent in the sample. By taking the bulking values of the pigments and the specific gravity of the vehicle, it is found by calculation that there were 148 cc. of pigments, 447 cc. of vehicle and 100 cc. of solvent. From this information it was determined that the percentage of pigment in the paint by volume was 21.3%. It will be noted that this figure of 21.3% is a variation over the 25% previously referred to for the reason that the 25% was estimated upon a formulation free of solvent.

In the 10 cc. sample actually used, only 5 cc. of the paint under investigation were actually present, due to the addition of the solvent. It is then evident that 21.3% by volume of the 5 cc. of paint in the sample were pigment. Converted to actual volume, it is determined that 1.06 cc. of pigment were actually present. The volume of the filter cake was found to be 1.65 cc. The critical pigment volume concentration of this particular pigment-vehicle combination may then be calculated by dividing the volume of the pigment present in the sample by the volume of the filter cake. This is found to be 40%.

From the foregoing illustrative example it was determined by a relatively simple procedure that the critical pigment volume concentration of the particular pigment-vehicle combination used was 40%. That is to say, marked changes in the behavior characteristics of that particular combination occur when the percentage ratio by volume of pigment to the pigment plus the non-volatile vehicle volume is greater or less than 40%. This particular example and others carried out with different combinations have been checked with the above described heretofore known method and was found to be within 2% plus or minus, which percentage is well within the limits of experimental error and proof of the accuracy of the method and apparatus.

The original 25% concentration was merely an arbitrary figure and it will be obvious that any other percentage of pigment could be used in the original sample. It must be considered, however, that the practical range of pigment percentage must be selected with some care, since at relatively high pigment volume concentrations there is a tendency for the pigments to agglomerate, and as a result of the agglomeration the values for the critical pigment volume concentration thereafter determined are too low.

Referring now more particularly to the drawings and especially to Fig. 1, there is illustrated one form of apparatus which may be utilized in carrying out the method. In this form of apparatus, a glass cylinder 1 is fitted with a two-hole rubber stopper 2. One of the holes 3 is preferably smaller than the other hole 4. A curved glass delivery tube 5 is located in the hole 3 and has one end thereof extending downwardly into the cylinder 1. The opposite end of the delivery tube 5 is adapted to be connected to a source of low pressure such as a vacuum pump (not shown).

A Gootch crucible filter adapter 6 is adapted to have the stem thereof located in the larger hole 4 of the rubber stopper 2 and is fitted at its upper end with a soft rubber crucible adapter 7. A critical pigment volume concentration cell 8 is adapted to fit into the adapter 7 and has a fritted glass filter medium 9 in the base thereof. A restricted inlet 10 is formed at the top of the cell 8 to permit the paint sample to be placed therein. In carrying out the method it is necessary to know the volume of the cell 8 and for this purpose a calibration mark 11 is placed in the restricted inlet 10. The cell 8 thereupon provides a volumetric chamber which joins the filter medium 9. The crucible adapter 7 serves to form a seal between the cell 8 and the vacuum cylinder 1.

The apparatus illustrated in Fig. 2 operates in a similar manner to that shown in Fig. 1, but constitutes an improved form thereof. A flask of suitable form, such as the Erlenmeyer flask 12, is provided with a delivery tube 13 at any suitable location thereon and has a standard taper ground glass mouth portion 14. A standard taper ground glass adapter 15 is fitted with a suitable filter element 16 and the entire unit is adapted to be placed over the mouth 14 of the flask 12. A standard taper adapter 17 is provided at its upper end with a restricted inlet 18 which has thereon a calibration mark 19. The space within the adapter 17, considering the filter 16 as the bottom thereof, will thereby have a known volume up to the calibration mark 19. The tube 13 extending from the flask 12 is also adapted for attachment to suction means such as a commercial vacuum pump (not shown).

The type of apparatus illustrated in Fig. 2 was utilized in carrying out the illustrative example described hereinabove. The 10 cc. of sample was metered into the cell 17 through the restricted inlet 18. It was known that the volume of the cell 17 from the filter 16 up to the calibration mark 19 was 25 cc. After the sample was placed within the cell 17 the vacuum pump was operated to create a vacuum in the flask 12 and accelerate the filtering action by drawing the excess vehicle through the filter 16 and into the flask 12. The volume of the remaining filter cake in the cell 17 was determined by metering an immiscible liquid, such as water, into the cell 17 and filling the cell up to the calibration mark 19. In the example given, the volume of water necessary to fill the cell 17 to the calibration mark 19 was found to be 25.35 cc. It was known that the volume of the cell 17 was 25 cc. and by subtraction it was determined that the volume of the filter cake remaining in the cell was 2.65 cc.

It is to be noted that it is possible to filter out the excess vehicle in the combination merely by gravity, but the time necessary for this operation can be greatly accelerated by forcing the excess vehicle through the filter by some outside means, such as the vacuum pump described above. Fig. 3 illustrates a type of apparatus which can be utilized for carrying out the method wherein a centrifuge is used for creating the filtering force instead of a vacuum.

Referring to Fig. 3 it will be seen that a rubber stopper 20 is used to adapt the standard taper ground glass adapter 21 to a centrifuge tube (not shown). Another standard taper ground glass adapter 22 is adapted to be inserted within the adapter 21 and has a similar liquid permeable filter member 23 in the bottom thereof. Still another standard taper adapter 24 is located within the adapter 22 and is provided with a restricted inlet 25 in the top thereof and a calibration mark 26 thereon. The method may be carried out in identically the same manner as described above by metering a predetermined volume of paint into the inlet 25. The adapters 22 and 24 constitute a cell which receives the sample of paint.

The rubber stopper 29 may be used to attach the cell to a centrifuge tube thereupon forcing the excess vehicle through the filter 23 by centrifugal force. The volume of the remaining filter cake can then be determined in a similar manner by metering into the cell a sufficient quantity of water or other immiscible liquid to the calibration mark 26. Subtracting the amount of water added from the total volume of the cell will give the volume of the filter cake remaining therein. Calculation of the critical pigment volume concentration may then be carried out in the manner described above, by dividing the volume of pigment present in the sample by the volume of the filter cake and converting to percent.

Fig. 4 is illustrative of the graphic possibilities in the study of given pigment and vehicle combinations. The abscissa represents all available combinations of a given pigment and a given vehicle ranging from 0% pigment to 100% pigment and from 100% non-volatile vehicle to 0% non-volatile vehicle. The ordinate of the graph represents the permeability of the given pigment-vehicle combination. The letters P. V. C. represent the pigment volume concentration of the combination and the letters C. P. V. C. indicate the critical pigment volume concentration. After the critical pigment volume concentration has been determined it is then possible to determine the interstitial oil and the excess oil. Also, by other methods the bound oil can be determined. The dot-dash curved line on the graph is a representative curve illustrating the change in permeability of a given film containing a given pigment and vehicle as the pigment volume concentration of the combination is increased. It will be noted that there is a marked change in the permeability of the combination at the critical pigment volume concentration.

The following factors have been found to effect the critical pigment volume concentration of pigmented coating systems:

1. The fundamental packing characteristics of the pigment, and/or the combination of pigments selected.
2. The type of binder or vehicle employed.
3. The types and amounts of other agents present.
4. The degree of fineness of the pigment dispersion in the liquid, or the "grind" of the combination.

As these factors can be related to the critical pigment volume concentration, they in turn may be investigated as to their effect upon a combination by studies of their effect upon the critical pigment volume concentration under controlled conditions, and thereby aid in the formulation of materials of optimum value for a particular specification.

The critical pigment volume concentration, in addition to being defined as that pigment volume concentration above and below which a marked change in behavior characteristics takes place, may also be defined in another way as being that ratio of pigment volume to the pigment volume plus the non-volatile vehicle volume wherein just sufficient binder or vehicle is present to satisfy the surface requirements of the pigment and to completely fill the voids or the interstitial spaces between the pigment particles. A further observation is that the critical pigment volume concentration represents the densest packing of the particles, commensurate with the degree of dispersion of the system.

It has been determined that the same pigment combination with different vehicles in the same pigment volume concentration ratios will give a different value for the critical pigment volume concentration. For example, a combination of anatase titanium dioxide and raw linseed oil was found to have a critical pigment volume concentration of 26%. When the raw oil was substituted for by using a heat bodied linseed oil, the critical pigment volume of concentration was found to be 38%. If the sample was made using a blend of the oils, the critical pigment volume concentration was found to be identical with that when the bodied oil was used alone, rather than an average of the two.

In a similar system as that described above, when the pigment volume concentration was held constant and very small increments of linseed fatty acids were added, it was found that up to 2.1% addition of fatty acid there was a continuing change in the critical pigment volume concentration, which became constant when more than the 2.1% fatty acid was added. This illustrates that small amounts of addition agents have an effect upon the critical pigment volume concentration, and also indicates a means of qualitative and quantitative study of the effect of such agents upon a given pigment-vehicle combination.

Changes may be made in the form, arrangement and construction of the apparatus disclosed herein and in the steps of the method without in any way departing from the spirit of the invention or sacrificing any of the attendant advantages thereof, provided, however, that such changes fall within the scope of the claims appended hereto.

The invention is hereby claimed as follows:

1. The method of determining the critical pigment volume concentration of a pigment-vehicle combination containing a known volume of pigment, which comprises the steps of metering a predetermined volume of the combination into a filter cell having a known volume, filtering out the excess vehicle from the combination thus leaving a filter cake in the cell, and metering a sufficient quantity of a liquid immiscible with said filter cake to fill said cell, the volume of said filter cake being the difference between the known volume of said cell and the amount of said liquid added thereto and the critical pigment volume concentration being the volume of pigment present in the predetermined volume of the combination divided by the volume of the filter cake.

2. A device for the quantitative determination of the critical pigment-volume relationship of a pigment-vehicle system which comprises in combination a calibrated hollow-bodied open bottomed tapered sided upper element and a tapered sided lower element shaped to nest in fluid-tight engagement with said upper element, the upper part of said lower element forming the bottom of a chamber in said upper element of reproducibly exact dimension, said upper element being characterized by a restricted orifice therein and the upper part of said lower element consisting of a fluid permeable filter plate adapted to retain pigments within the defined chamber and to permit fluids to pass therethrough, and channel means for filtrate efflux downwardly of said filter plate.

3. The method of determining a transition point in the behavior of a dispersion of a pigment in a vehicle known as the critical pigment volume concentration by means of a single determination which comprises isolating a known volume of a given pigment-vehicle dispersion system, the actual pigment volume of which is known, substantially removing the free vehicle from said pigment-vehicle system, measuring the volume of the pigment filter cake under its most dense packing arrangement, and thereafter comparing the actual pigment volume with the volume determined under the densest packing arrangement to determine the value of the said transition point of said system.

References Cited in the file of this patent

UNITED STATES PATENTS

| | | |
|---|---|---|
| 972,030 | Smith | Oct. 4, 1910 |
| 1,435,367 | Ablahadian | Nov. 14, 1922 |
| 1,938,975 | Parks | Dec. 12, 1933 |

OTHER REFERENCES

Aloe Co. Apparatus Catalogue No. 102, p. 521, Figs. 42450 and 42460, Aloe Co., St. Louis, Mo.

Catalog of Laboratory Equipment, Eimer & Amend, New York, 85th Anniversary Catalog, 1936, pp. 339, 340, 341.